United States Patent [19]

Lindenman

[11] Patent Number: 4,969,697
[45] Date of Patent: Nov. 13, 1990

[54] PRESSURE DIFFERENTIAL RELEASE VALVE

[75] Inventor: Charles E. Lindenman, South Bend, Ind.

[73] Assignee: Allied-Signal Inc., Morristown, N.J.

[21] Appl. No.: 369,386

[22] Filed: Jun. 21, 1989

[51] Int. Cl.[5] ............................................. B60T 15/12
[52] U.S. Cl. ................................. 303/119; 137/493.3; 303/9.71; 303/68
[58] Field of Search ................. 137/493.3, 493.9, 110, 137/505.13, 493; 303/68, 9.71, 9.73, 119

[56] References Cited

U.S. PATENT DOCUMENTS

| | | | |
|---|---|---|---|
| 3,010,282 | 1/1961 | Jansson | 60/54.5 |
| 3,252,740 | 5/1966 | Stelzer | 303/6 |
| 3,375,852 | 4/1968 | Milster | 137/493.3 |
| 3,598,451 | 8/1971 | Doerfler | 137/493.9 X |
| 3,677,605 | 7/1972 | Matsumoto et al. | 303/9.73 |
| 3,721,473 | 3/1973 | Budzich | 303/6 C |
| 3,742,926 | 7/1973 | Kemp | 123/139 DP |
| 3,771,837 | 11/1973 | Budzich | 303/6 C |
| 3,838,895 | 10/1974 | Deem | 303/84 A |
| 3,886,966 | 6/1975 | Yabuta et al. | 303/9.73 X |
| 4,024,712 | 5/1977 | Takeuchi | 60/535 |
| 4,657,315 | 4/1987 | Belart | 303/113 |
| 4,660,899 | 4/1987 | Ando et al. | 303/115 |
| 4,685,749 | 8/1987 | Otsuki et al. | 303/116 |
| 4,702,529 | 10/1987 | Tobiasz | 303/6 C |
| 4,703,979 | 11/1987 | Nakanishi et al. | 303/116 |
| 4,722,575 | 2/1988 | Graham | 303/2 |
| 4,725,105 | 2/1988 | Brown | 303/116 |
| 4,736,989 | 4/1988 | Myers et al. | 303/6 C |
| 4,750,789 | 6/1988 | Belart et al. | 303/114 |
| 4,753,487 | 6/1988 | Bach et al. | 303/9.63 |
| 4,753,490 | 6/1988 | Belart et al. | 303/114 |
| 4,768,843 | 9/1988 | Baughman et al. | 303/119 |
| 4,779,933 | 10/1988 | Schonlau et al. | 303/9.73 |
| 4,785,847 | 11/1988 | Steer et al. | 137/505.25 |

FOREIGN PATENT DOCUMENTS 773642   5/1957   United Kingdom .

Primary Examiner—Stephen M. Hepperle
Attorney, Agent, or Firm—Larry J. Palquta; Ken C. Decker

[57] ABSTRACT

The pressure differential release valve (130) comprises a three-part body having a first end member (132), an intermediate body member (133), and a second end member (134). The members (132, 133, 134) define an interior stepped bore (139) containing a differential area piston (141) and a poppet (161). The differential area piston (141) and poppet (161) have respective longitudinal through-openings (142, 162) and the poppet (161) engages a valve seat (168) of the body. The longitudinal through-opening (162) of the poppet (161) includes a ball valve (165) biased by a spring (166) into engagement with a valve seat (164) of the poppet (161). The piston (141) abuts the poppet (161) at an end (151) adjacent the valve seat (164) of the poppet (161). Fluid pressure received at an end (135) opening in the first end member (132) is transmitted through the body and exits an end opening (136) at the second end member (134). The fluid pressure displaces the ball valve (165) against the spring (166) so that fluid flows around the ball valve (165) and through the longitudinal through-opening (162) of the poppet (161). A reverse flow of fluid between the end openings (135, 136) causes, at a predetermined pressure differential, the piston (141) and poppet (161) to be displaced within the stepped bore (139) so that fluid flows around the poppet (161) and into the longitudinal through-opening (142) of the piston (141) whereby the ball valve (165) within the poppet (161) is effectively bypassed.

13 Claims, 2 Drawing Sheets

PRESSURE DIFFERENTIAL RELEASE VALVE

The present invention relates generally to a pressure differential release valve, in particular a pressure differential release valve which may be utilized in an anti-lock braking system.

Numerous types of valves have been utilized in hydraulic brake systems. Check valves are typically utilized to insure that fluid flows in only one direction within a particular hydraulic line. Many times combinations of check valves have to be utilized in order to insure that fluid flows in different directions according to different hydraulic pressures and other predetermined flow directions. Often times a parallel or bypass circuit is utilized in order to attain the desired flow characteristics. It is highly desirable to provide a valve device which permits flow in opposite directions through the valve but at predetermined conditions, so that the plurality of valves and branch lines previously required are replaced by a single valve. The obvious advantages of simplifying the hydraulic circuit, reducing the number of valves, and obtaining other advantages in relation to other components, are apparent according to the type of system utilized.

The present invention provides a solution to the above problems by providing a pressure differential release valve, comprising a valve body having therein a stepped bore with first and second openings at ends thereof, a differential area piston disposed within said bore, a poppet disposed in said bore between said differential area piston and said first opening, the differential area piston and poppet each having a through opening, a valve mechanism disposed within the through opening of the poppet and biased by spring means, an end of the poppet engaging a valve seat at the body, fluid flow from the second opening passing through the piston and opening said valve mechanism so that the fluid flow communicates with the first opening, and fluid flow from the first opening to the second opening causing, at a predetermined pressure differential, conjoint displacement of said piston and poppet so that fluid flows between the valve seat at the body and the poppet to the through opening of the piston wherein the valve mechanism is bypassed.

One way of carrying out the invention is described in detail below with reference to the drawings which illustrate an embodiment, in which.

Figure 1:
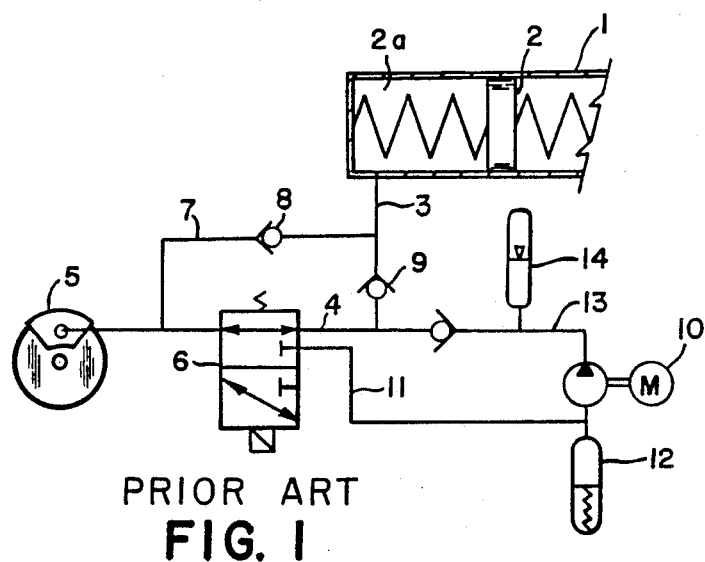
FIG. 1 is a schematic representation of a portion of a vehicle anti-skid system.

FIG. 1 shows a portion of a typical prior anti-skid system which utilizes a master cylinder 1 having a piston 2 which creates hydraulic fluid pressure in piston chamber 2a. Hydraulic fluid pressure is transmitted via line 3, through isolation check valve 9, to line 4 where it passes through electrically actuated valve 6 before it reaches the wheel cylinder of the wheel brake 5. During normal braking, the hydraulic fluid pressure follows this fluid path as the brakes are applied. Upon release of braking, the fluid pressure cannot return via line 4 to line 3 because of the isolation check valve 9. Isolation check valve 9 is placed in line 3 for the purpose of isolating a pump 10 from the chambers of the master cylinder, and accumulator 14 can provide pressure as needed. Therefore, during release of the brakes, fluid may return to chamber 2a of master cylinder 1 via bypass line 7, release check valve 8, and through line 3 to chamber 2a. During anti-lock braking operation, the motor 10 is energized whereby fluid is pumped through line 13 to line 4, and through electrically actuated valve 6 to the wheel brake 5 in order to build braking pressure thereat. When the fluid pressure is to be decayed from wheel brake 5, electrically actuated valve 6 is operated to permit fluid to decay through line 11 to the sump 12 and be drawn back into the inlet of pump 10 where fluid is pumped out to line 13. This is a schematic of a typical pumpback adaptive braking system wherein the isolation check valve 9 isolates pump-generated fluid pressure from the master cylinder chambers during anti-lock braking operation, and line 7 and check valve 8 permit fluid pressure to return to chamber 2a of the master cylinder during the release phase of normal braking. This portion of an anti-skid system is illustrated in Gatt et al. U.S. Pat. No. 4,869,561 incorporated by reference herein.

Figure 2:
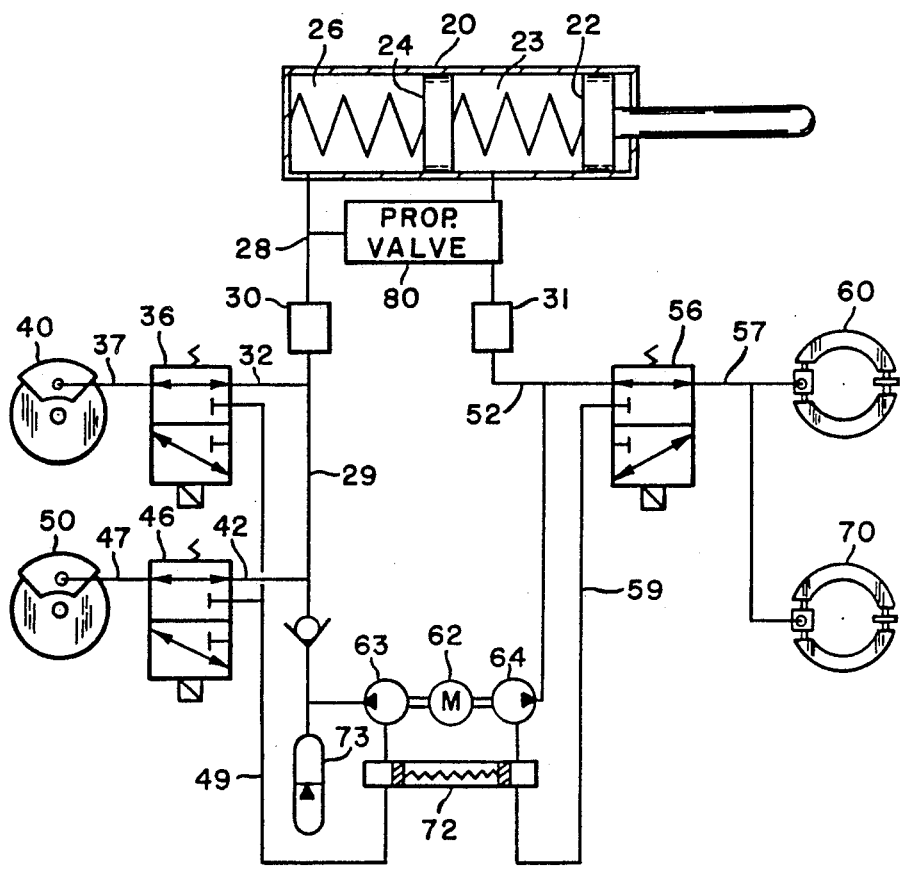
FIG. 2 is a schematic illustration of an anti-lock braking system utilizing the valve of the present invention.

In order to eliminate the two check valves 8 and 9 and the bypass line 7, the present invention may be utilized in an anti-lock or adaptive braking system such as that illustrated in FIG. 2. In FIG. 2, a master cylinder 20 includes pistons 22 and 24 which pressurize chambers 23 and 26. Chamber 26 communicates fluid pressure through line 28, pressure differential release valve 30 and line 32, electrically actuated valve means 36, and line 37 to the right front wheel brake 40. Likewise, fluid pressure is also transmitted via line 29 to line 42, electrically actuated valve means 46, and line 47, to the left front wheel brake 50. The braking pressure generated in master cylinder chamber 23 is transmitted via line 58, pressure differential release valve 31, line 52, electrically actuated valve means 56, and line 57 to the rear wheel brakes 60 and 70. Electrically actuated valve means 36 and 46 are connected with decay line 49 which communicates with the inlet of pumping section 63 of pump 62 via dual sump 72. Likewise electrically actuated valve means 56 communicates via decay line 59 with pumping section 64 via dual sump 72. Additional fluid pressure may be provided to the front wheel brakes via accumulator 73. The rear wheel brakes 60 and 70 receive fluid pressure via a proportioning valve 80 which is balanced by fluid pressures generated in chambers 23 and 26, but provides proportioning only for the rear wheel brakes 60 and 70. Pressure differential release valves 30 and 31 are identical unitary valve assemblies and each replaces the previously utilized bypass line around the respective electrically actuated valve means and the two check valves utilized, one as a release check valve and the other as an isolation check valve, in order to isolate the pump from the respective chamber of the master cylinder and to permit release fluid flow.

Figure 3:
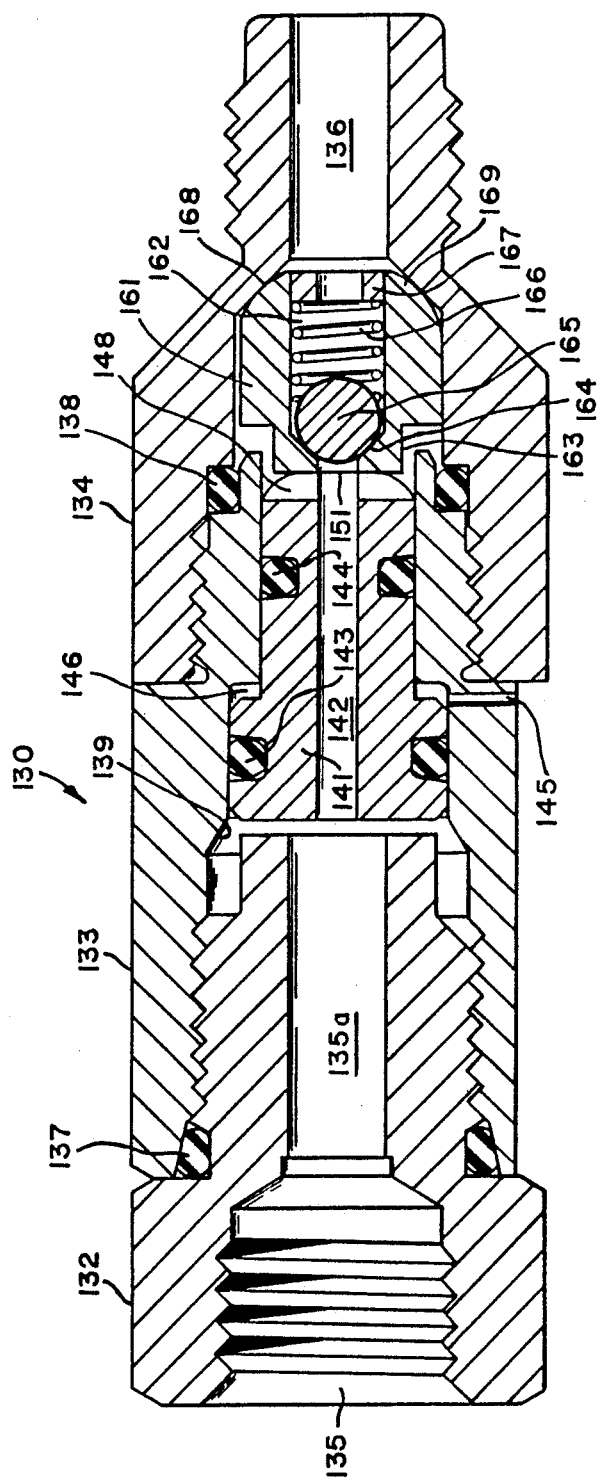
FIG. 3 is a section view of the valve of the present invention.

The pressure differential release valve of the present invention is illustrated in detail in FIG. 3. FIG. 3 illustrates pressure differential release valve 130 which includes a three-part body comprising first end member 132, intermediate body member 133, and second end member 134. End member 132 includes an end opening 135 which communicates with the master cylinder and end member 134 includes end opening 136 which communicates with the braking circuit. A seal 137 is located between end member 132 and intermediate body member 133 which are threadedly connected together. Likewise, intermediate body member 133 and second end member 134 are threadly connected together and include therebetween a sealing mechanism 138. The body of valve 130 includes a stepped bore 139 which encloses a differential area piston 141 that includes a longitudinal through-opening 142 and a pair of seals 143 and 144 disposed about piston 141. Intermediate body member 133 includes a vent opening 145 which communicates with a stepped bore area 146 defined between the seals 143 and 144. Piston 141 includes a transverse end slot 148 which permits fluid to communicate with the longitudinal through-opening 142. End 151 of piston 141 abuts a poppet 161 which includes a longitudinal through-opening 162 having adjacent end 163 a poppet valve seat 164. Ball valve 165 is disposed within through-opening 162 and is biased by spring 166 into engagement with seat 164. The spring seats on end member 167. Second end member 134 includes a valve seat 168 which is engaged by the curved end 169 of poppet 161.

The pressure differential release valve 130 illustrated in FIG. 3 operates in the following manner during normal and anti-lock or adaptive braking system operation. During normal braking operation, fluid pressure is received from the master cylinder via opening 135 and transmitted through the longitudinal opening 135a to longitudinal through-opening 142, against ball valve 165 which is displaced against spring 166 so that fluid passes between valve seat 164 and ball valve 165 to longitudinal opening 162, opening 136 and to the associated braking circuit. The differential area piston 141 and poppet 161 are designed so that a predetermined pressure differential across these members causes the piston and poppet to be displaced toward end opening 135 in order to permit a reverse flow of fluid through valve 130. The pressure differential is approximately 2 to 1, i.e. the pressure being communicated through end opening 136 needs to exceed the pressure present at end opening 135 at an approximately 2 to 1 ratio such that piston 141 and poppet 161 will translate to the left and permit a reverse flow of pressure. Thus, during a release phase of braking when the pressure within the braking system becomes much greater than the relieved pressure within the chambers of the master cylinder and present at end opening 135, the piston 141 and poppet 161 will translate toward end opening 135 to permit fluid pressure at end opening 136 to flow between poppet end 169 and valve seat 168 so that fluid flows around poppet 161, through transverse opening 148 of piston 141 to longitudinal openings 142 and 135a, to end opening 135 and back toward the chamber of the master cylinder. Thus, valve 130 permits a return flow of fluid pressure to the associated chamber of the master cylinder during the release phase of normal braking.

During anti-lock or adaptive braking operation when the system is being operated due to an incipient skidding condition, the vehicle operator will be pressing the brake pedal to create a large fluid pressure in the master cylinder chambers and this pressure will be transmitted to valve 130 via opening 135. Because of the pressure differential ratio (2/1) required to translate piston 141 and poppet 161 to the left in FIG. 3 so that reverse flow is permitted past valve seat 168 and around poppet 161, a very large pressure is required at end opening 136. This very large pressure generally exceeds the pressure generated by pump 162 (see FIG. 2) during anti-lock braking system operation. As a result, while the poppet may be displaced occasionally during high pressure plateaus, the master cylinder will generally remain isolated from the fluid pressures created in the hydraulic braking system during anti-lock braking operation. This is effected by the closed position of poppet 161 in relation to associated valve seat 168 and occasional slight openings therebetween which comprise an effective restriction of any fluid flow. When anti-lock braking system operation ends, there will be a quick reduction of pressure within the master cylinder as the vehicle operator releases the brake pedal, and the higher pressure generated within the hydraulic braking system will be of a magnitude great enough with respect to fluid pressure at end opening 135 so that the pressure differential ratio of 2 to 1 is met or exceeded and a reverse flow of fluid is permitted through valve 130 by means of the conjoint displacement of piston 141 and poppet 161 so that fluid flows past valve seat 168 and around poppet 161.

The advantages provided by the release valve of the present invention are substantial in that the two check valves and bypass line illustrated in FIG. 1 have been eliminated and replaced by a single release valve. Correspondingly, any modulator construction is simplified in that a bypass line is eliminated along with the release check valve. The excess fluid present in the system during the release phase of normal braking or during post anti-lock braking system operation is permitted to return to the master cylinder through the release valve. System noise may be reduced during anti-lock braking system operation by the placement of the valve of the present invention in a circuit which does not have an accumulator. The valve will isolate the circuit from the master cylinder. In certain hydraulic circuits with low volume flow requirements, the valve of the present invention may allow the deletion of accumulators. An additional highly desirable advantage of the present invention is that when the valve is utilized in a system having shuttle valves, during the release phase of braking fluid is permitted to flow in a reverse direction through the shuttle valves and this results in the cleaning of orifices within the shuttle valves by backwashing fluid through the orifice areas and thereby minimizing orifice plugging. This occurs because the bypass line which normally carried fluid returning to the master cylinder around the shuttle valve has been eliminated and now fluid may flow in a reverse direction back through the shuttle valve rather than bypassing it. Additionally, if orifices in a shuttle valve of an electrically actuated valve should become clogged by contaminants, instead of the anti-lock braking circuit experiencing hydraulic locking when the pump provides pressure which cannot reach the wheel brakes, the valve of the present invention permits the increasing pressure within the system to be transmitted back to the master cylinder so that hydraulic locking of the system is prevented. Also, the valve of the present invention reduces the probability of brake pedal kick-back during light brake pedal applications when the anti-lock braking system pumping pressure exceeds master cylinder pressure. This happens because of the orificing effect created by the poppet 161 and associated valve seat 168. When the valve of the present invention is utilized in an anti-lock braking system, the master cylinder isolation characteristics of the system are similar to that of an electrically isolated system. Prior systems have typically utilized electrically actuated valves which isolate the master cylinder from the system during anti-lock braking system operation. Such valves, which are more expensive, are eliminated by the valve of the present invention. The release valve provides fluid charging characteristics which will be similar to a check-valve type system wherein the valve has an inherent quick response resulting in potentially shorter stopping distances for the vehicle. Finally, the release valve provides for a reduction in the cost of an anti-lock braking system by replacing the bypass line, release check-valve, and isolation check-valve with the single release valve as disclosed herein.

I claim:

1. A pressure differential release valve, comprising a valve body having therein a stepped bore and openings at opposite ends thereof, a differential area piston disposed within said bore and having sealing means disposed thereabout, a poppet disposed in said bore between said differential area piston and one of said openings, the differential area piston and poppet each having therein a longitudinal through-opening the poppet including a valve mechanism disposed within the associated through-opening and the valve mechanism biased by spring means against a valve seat of the poppet, an end of the poppet engaging a valve seat of the body, fluid flow through the other opening passing through the longitudinal through-opening of the differential area piston and opening said valve mechanism so that the fluid flow is transmitted through the poppet to the one opening, and fluid flow in a reverse direction from the one opening to the other opening causing, at a predetermined pressure differential, said differential area piston and poppet to the displaced together so that fluid flows between the valve seat of the body and the poppet to the longitudinal through-opening of the differential area piston so that the valve mechanism is bypassed, the release valve comprising a valve assembly located in a fluid line of an adaptive braking system wherein the valve assembly communicates at one end with master cylinder means and at the other end with electrical valve means and pressure increasing means.

2. The valve in accordance with claim 1, wherein the differential area piston comprises a transverse opening at an end abutting the poppet, so that flow around the poppet may communicate freely with the longitudinal through-opening of the differential area piston.

3. The valve in accordance with claim 2, wherein the sealing means about the differential area piston comprises seals at opposite ends of the piston, the body having a transverse vent so that an area between the seals is vented to atmosphere.

4. The valve in accordance with claim 3, wherein the spring means biases the valve mechanism toward the differential area piston and into engagement with the valve seat of the poppet.

5. The valve in accordance with claim 4, wherein the body comprises a first end member which is received within the body and includes the other opening, the first end member extending to an end portion adjacent an end of the differential area piston.

6. The valve in accordance with claim 5, wherein the body further comprises a second end member attached to the body and receiving the poppet.

7. The valve in accordance with claim 6, wherein a seal is disposed between the second end member and the body in order to prevent fluid from exiting the stepped bore.

8. The valve in accordance with claim 7, wherein a seal is disposed between the first end member and the body.

9. A pressure differential release valve, comprising a valve body having therein a stepped bore with first and second openings at ends thereof, a differential area piston disposed within said bore, a poppet disposed in said bore between said differential area piston and said first opening, the differential area piston and poppet each having a through opening, a valve mechanism disposed within the through opening of the poppet and biased by spring means, an end of the poppet engaging a valve seat at the body, fluid flow from the second opening passing through the piston and opening said valve mechanism so that the fluid flow communicates with the first opening, and fluid flow from the first opening to the second opening causing, at a predetermined pressure differential, conjoint displacement of said piston and poppet so that fluid flows between the valve seat at the body and the poppet to the through opening of the piston wherein the valve mechanism is bypassed, the valve comprising a unitary valve assembly disposed in a hydraulic line of an adaptive braking system, the line communicating at one end with a master cylinder and at the other end with solenoid valve means and pressure producing means.

10. The valve in accordance with claim 9, wherein the differential area piston comprises a transverse opening at an end abutting the poppet, so that flow around the poppet may communicate freely with the through-opening of the differential area piston.

11. The valve in accordance with claim 9, wherein sealing means about the differential area piston comprises seals at opposite ends of the piston, the body having a transverse vent so that an area between the seals is vented to atmosphere.

12. The valve in accordance with claim 9, wherein the spring means biases the valve mechanism toward the differential area piston and into engagement with a valve seat of the poppet.

13. The valve in accordance with claim 9, wherein the one end of the line communicates with proportioning valve means.

* * * * *